S. WYBLE.
VALVED COUPLING FOR LIQUID DISTRIBUTING SYSTEMS.
APPLICATION FILED SEPT. 12, 1921.

1,433,494.

Patented Oct. 24, 1922.

Inventor
Stanislaus Wyble,
By Frank S. Ackleman,
Attorney

Patented Oct. 24, 1922.

1,433,494

UNITED STATES PATENT OFFICE.

STANISLAUS WYBLE, OF EUNICE, LOUISIANA, ASSIGNOR OF ONE-FOURTH TO JOSEPH J. McGEE, OF EUNICE, LOUISIANA.

VALVED COUPLING FOR LIQUID-DISTRIBUTING SYSTEMS.

Application filed September 12, 1921. Serial No. 500,112.

*To all whom it may concern:*

Be it known that I, STANISLAUS WYBLE, a citizen of the United States of America, and resident of Eunice, in the parish of St. Landry and State of Louisiana, have invented certain new and useful Improvements in Valved Couplings for Liquid-Distributing Systems, of which the following is a specification.

This invention relates to valved couplings for liquid distributing systems, the same being applicable for use in house and city water systems, and broadly, in connection with any piping system in which a controlling valve may be needed when the service or supply pipe connections are uncoupled.

An object of this invention is to provide a valved coupling which may be interposed in a pipe line, the valve of which is unseated by the application of a pipe section or cock to the end of the coupling, means being provided for causing the unseating of the valve when the section of the pipe or cock is attached to the coupling; and means being furthermore provided for causing the valve to seat upon the removal of the said pipe section or cock.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
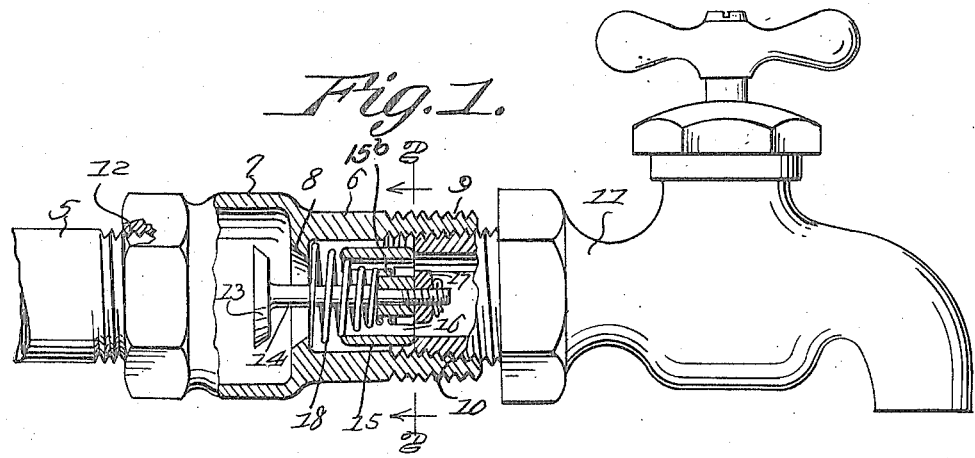
Figure 1 illustrates a sectional view of the valved coupling and a portion of the nipple of a cock applied thereto.
Figures 2, 3:
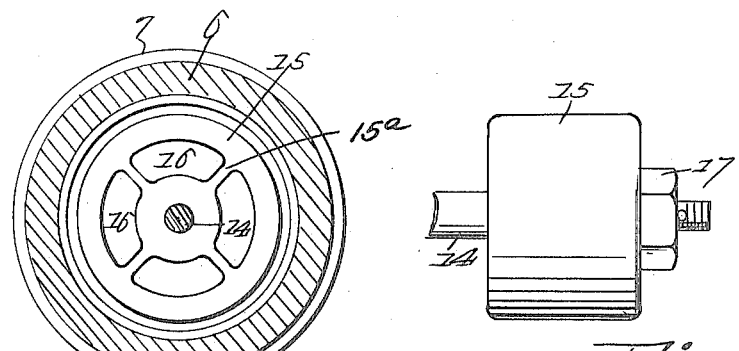
Figure 2 illustrates a sectional view of the device on the line corresponding with the line 2—2 of Fig. 1.
Figure 3 illustrates a side elevation of a fragment of the valve stem and parts associated with it.

In these drawings 5 denotes a supply or service pipe which may be of any appropriate type, to which a coupling embodying the invention can be attached. It will be understood by one skilled in the art that the invention can be applied to a fire plug, to branches of hose couplings, so that one of the hose lines can be disconnected without interfering with the supply of water to the others, since the valve of the invention will prevent the discharge of fluid through the other branches of the coupling, and of course, each branch of the hose coupling can have a coupling embodying the invention applied thereto, in order that any one of a number of hose lines can be applied or removed without interfering with others on the same supply line.

In the embodiment of the invention here illustrated, which, however, is but one of many possible embodiments, the coupling comprises a straight portion 6 and an enlarged portion 7, which latter forms a chamber or passage relatively greater in diameter than the chamber or passage through the portion 6, and there is a valve seat 8 preferably formed at the junction of the portions 6 and 7. The purpose of having the portion 7 enlarged is to increase the clearance between the wall of the chamber and the valve to permit an uninterrupted flow of fluid around the valve when it is open.

The section 6 is externally threaded as at 9 at its outer end and internally threaded as at 10 on the same end, the purpose being that the threads 10 may be employed for engaging the threads of a nipple of a cock such as 11, or the threads of a pipe which may be connected to the coupling. In fact, the internal threads are intended to engage with standard fittings, whereas the external threads may be employed for attaching sleeves or bushings when the valve is to be used as a plain check. The coupling is furthermore threaded as at 12 to engage the threads of the pipe 5.

A valve 13 has a valve stem 14, the said valve being intended to engage the valve seat 8 when communication through the coupling is to be interrupted, and the valve stem extends through the central aperture of a valve guide 15 which is longitudinally movable in the bore of the section 6 of the coupling. The valve guide comprises an annular outer portion or shell having an apertured web or wall 15$^a$ at one end, and a boss 15$^b$ in the center of the said web, provided with an aperture for the valve stem 14, the apertures 16 in said web permitting the flow of fluid through the valve guide. The valve stem is secured on the guide by a nut 17, and a spring 18 is interposed between the valve guide and the valve seat and it is operative to hold the valve normally closed. The end of the spring extends into the guide and seats on the web 15ᵃ.

As shown in Fig. 1, the nipple of the cock 11 bears against the outer end of the valve guide and forces the valve from its seat against the action of the spring, whereas upon the removal of the cock, the spring will operate to force the valve closed.

Figure 4:
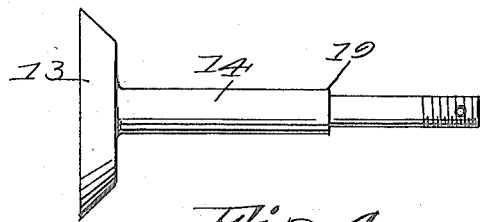
Figure 4 illustrates a side elevation of the valve and stem.

It is seen from an inspection of Fig. 4 that the valve stem has a shoulder 19 against which the guide will bear in order to communicate the motion of the valve guide to the valve stem, and the bore of the valve guide is approximately equal in diameter to the reduced portion of the valve stem beyond the shoulder. This coupling, as stated, may be used as a check valve.

This device is of great utility as a boiler feed connection, or as a coupling for water lines in boats where the joint is made below the water line, or it may be used in connection with pressure tanks of different kinds, and of course, the inventor does not wish to be limited with respect to its application or use.

I claim:

In a valved coupling, a body having a valve seat therein and a chamber on each side of the said valve seat, the said body being adapted to be connected to a supply pipe, a valve in one of the chambers adapted to coact with the valve seat to interrupt communication through the coupling, a valve stem projecting from the valve and extending into the other chamber of the valved coupling, a valve guide longitudinally movable in the chamber into which the valve stem projects, the said valve guide comprising an annular shell, an apertured web, and a central boss having an aperture for the reception of the valve stem, a spring interposed between the valve seat and the web, means for securing the valve stem in the said boss, the said guide constituting an abutment to be engaged by a portion of an element connected to the coupling for the passage of fluid and adapted to be operated thereby to unseat the valve.

STANISLAUS WYBLE.